US00RE43339E

(19) United States
(12) Reissued Patent
Ro et al.

(10) Patent Number: US RE43,339 E
(45) Date of Reissued Patent: May 1, 2012

(54) AUDIO AND VIDEO SIGNAL RECORDING AND REPRODUCTION APPARATUS AND METHOD

(75) Inventors: Se Yong Ro, Seoul (KR); Han Jung, Seoul (KR)

(73) Assignee: LG Electronics Inc., Seoul (KR)

(21) Appl. No.: 10/793,915

(22) Filed: Mar. 8, 2004

Related U.S. Patent Documents

Reissue of:
(64) Patent No.: 5,793,444
Issued: Aug. 11, 1998
Appl. No.: 08/498,585
Filed: Jul. 6, 1995

U.S. Applications:
(63) Continuation of application No. 09/386,183, filed on Aug. 31, 1999, now Pat. No. Re. 39,039.

(30) Foreign Application Priority Data

Jul. 6, 1994 (KR) ..... 94-16190

(51) Int. Cl.
*H04N 5/775* (2006.01)
*H04N 9/64* (2006.01)

(52) U.S. Cl. ..... 386/230; 386/327; 386/328; 386/355; 348/719

(58) Field of Classification Search ..... 386/117, 386/118, 96, 46, 230, 327, 328, 355; 348/719; 719/719

See application file for complete search history.

(56) References Cited

U.S. PATENT DOCUMENTS

| | | | | |
|---|---|---|---|---|
| 4,813,014 | A | | 3/1989 | DeBell |
| 4,841,506 | A | * | 6/1989 | Kiyoura et al. ..... 369/178.01 |
| 4,901,160 | A | | 2/1990 | Kinoshita et al. |
| 5,138,600 | A | * | 8/1992 | Aoyagi ..... 369/30.03 |
| 5,153,730 | A | | 10/1992 | Nagasaki et al. |
| 5,301,240 | A | | 4/1994 | Stockum et al. |
| 5,479,266 | A | | 12/1995 | Young et al. |
| 5,488,409 | A | | 1/1996 | Yuea et al. |
| 5,497,193 | A | | 3/1996 | Mitsuhashi et al. |
| 5,497,194 | A | | 3/1996 | Sakagami et al. |
| 5,511,000 | A | | 4/1996 | Kaloi et al. |
| 5,511,054 | A | | 4/1996 | Oishi et al. |
| 5,559,779 | A | | 9/1996 | Iizuka |
| 5,581,360 | A | | 12/1996 | Matsumura et al. |
| 5,719,786 | A | * | 2/1998 | Nelson et al. ..... 715/716 |
| 5,740,317 | A | | 4/1998 | Sedlmeyer et al. |
| 5,966,495 | A | | 10/1999 | Takahashi et al. |

FOREIGN PATENT DOCUMENTS

JP 62234288 10/1987

(Continued)

*Primary Examiner* — Vincent Boccio
(74) *Attorney, Agent, or Firm* — Birch, Stewart, Kolasch & Birch, LLP

(57) ABSTRACT

An audio and video recording and reproduction apparatus and method is described, which uses a movable storage memory such as a memory card, so that audio and video signals are easily accessed without separate editing devices. The apparatus uses a separable memory so that a deck is unnecessary, allowing small, lightweight constructions, and a compression algorithm results in longer playing time, while read/write operations robust to noise are achieved. Also, data desired by the user is easily accessible, and applications as a substitute for magnetic or disk media are also possible.

11 Claims, 4 Drawing Sheets

FOREIGN PATENT DOCUMENTS

| | | | |
|---|---|---|---|
| JP | 63-000887 | A1 | 1/1988 |
| JP | 01-232594 | A1 | 9/1989 |
| JP | 02-172382 | A1 | 7/1990 |
| JP | 02-292973 | A1 | 12/1990 |
| JP | 03-278782 | A1 | 12/1991 |
| JP | WO-93-02508 | A1 | 2/1993 |
| JP | 05-091452 | A1 | 4/1993 |
| JP | 05-109205 | A1 | 4/1993 |
| JP | 05-258534 | A1 | 10/1993 |
| JP | 05-336484 | A1 | 12/1993 |
| JP | 6-504893 | A1 | 6/1994 |

* cited by examiner

AUDIO AND VIDEO SIGNAL RECORDING AND REPRODUCTION APPARATUS AND METHOD

Matter enclosed in heavy brackets [ ] appears in the original patent but forms no part of this reissue specification; matter printed in italics indicates the additions made by reissue.

*This application is a reissue of application Ser. No. 08/498,585, filed on Jul. 6, 1995 (now U.S. Pat. No. 5,793,444), and is a continuation of application Ser. No. 09/386,183, filed on Aug. 31, 1999 (now U.S. Pat. No. Re. 39,039), which is a reissue of application Ser. No. 08/498,585, filed on Jul. 6, 1995 (now U.S. Pat. No. 5,793,444).*

BACKGROUND OF THE INVENTION

The present invention relates to an audio and video signal recording and reproduction apparatus and method which may record and reproduce compressed audio and video data, and more particularly to an audio and video signal recording and reproduction apparatus and method in which desired audio and video is easily obtained without a separate editing device by using movable storage memory such as memory cards.

Generally, an audio and video recording/reproduction apparatus uses magnetic or disk storage and reproduction media. Unfortunately, in magnetic or disk media, data is easily lost by external conditions such as magnetic disturbances or dust, and a deck including a driving apparatus is generally too large and heavy to be portable, with the added disadvantage that two devices are needed when editing video signals.

SUMMARY OF THE INVENTION

It is an object of the present invention to provide an audio and video recording and reproduction apparatus and method for storing compressed data using a large memory device, and by using separable memory devices such as a memory card, allows easy editing of selected data and reproduction on another machine when the separable memory card is attached.

To accomplish the above-mentioned objects, there is provided an audio and video signal recording and reproduction apparatus comprising a data recording unit for recording *at least one of* audio and video signals, a data reproduction unit for reproducing *at least one of* audio and video signals, and a separable storage unit for storing data by the data recording unit and outputting stored data by the data reproduction unit; and operating by the steps of determining a keyed input, storing data, wherein input data is processed and stored in the separable memory unit if the keyed input is determined to be a record signal, reproducing data, wherein data stored in the separable memory unit is reproduced and output if the keyed input is determined to be a reproduction signal, and searching data, wherein the contents of the data stored in the separable memory unit are read and displayed if the keyed input is determined to be a search signal.

These and other objects, features and advantages of this invention will become more apparent from the following detailed description of a preferred embodiment, when considered in connection with the accompanying figures.

BRIEF DESCRIPTION OF THE ATTACHED DRAWINGS

DETAILED DESCRIPTION OF THE INVENTION

A preferred embodiment of the present invention will be described below in detail.

Figure 1:
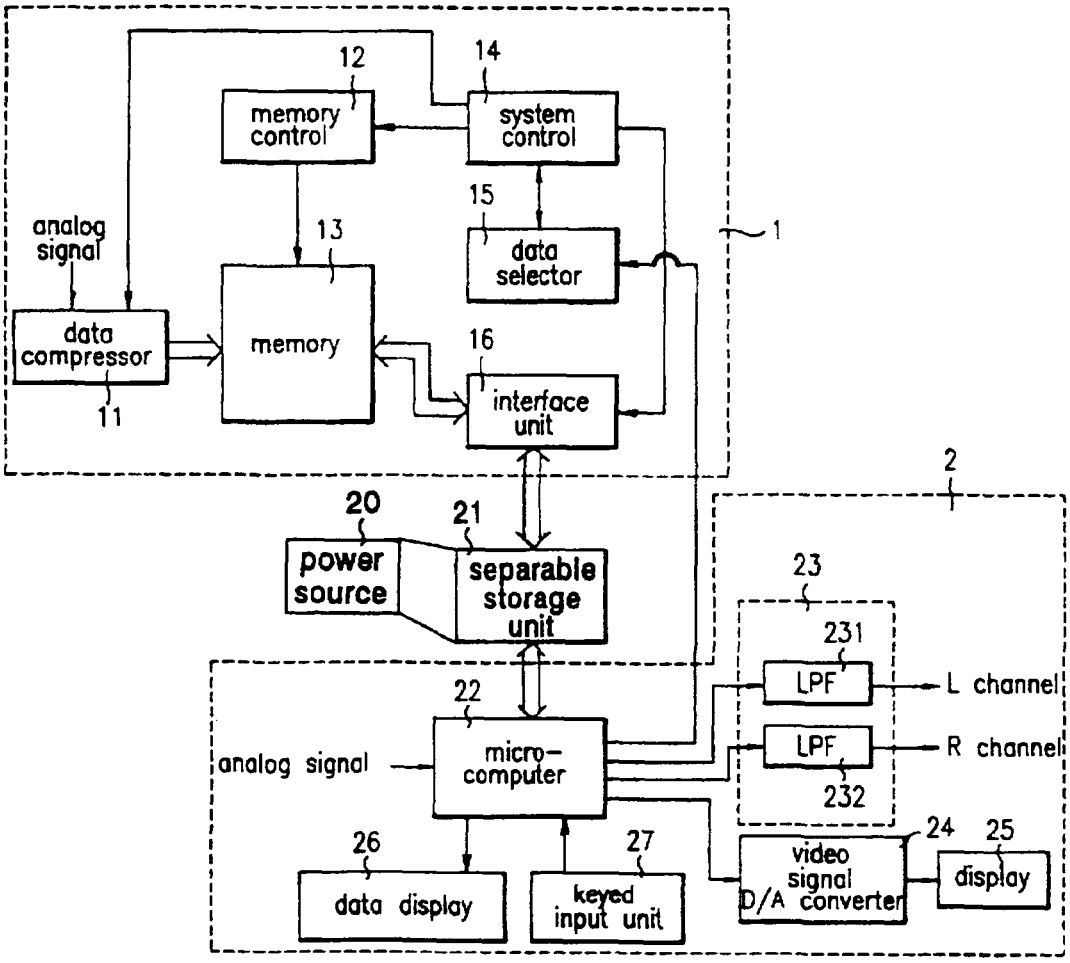
FIG. 1 is a schematic diagram of an audio and video signal recording and reproduction apparatus according to the present invention.

As shown in FIG. 1, an audio and video signal recording and reproduction apparatus according to *an embodiment of* the present invention comprises a data recording unit 1, a separable storage unit 21, and a data reproduction unit 2. A data reproduction unit 1 comprises a data compressor 11, *a* memory control 12, *a* memory 13, *a* system control 14, *a* data selector 15 and *an* interface unit 16, and records *at least one of* audio and video signals.

A data reproduction unit 2 comprises a microcomputer 22, *a* filter unit 23, *a* video signal D/A (Digital/Analog) converter 24, *a* display 25, *a* data display 26, and *a* keyed input unit 27, and reproduces *at least one of* audio and video signals.

A separable storage unit 21 is a separable memory-type storage device that receives and stores compressed audio and video data from the data recording unit 1 which are then reproduced in the data reproduction unit 2. The separable storage unit 21 is recorded by the data recording unit 1 and outputs stored data through the data reproduction unit 2. Here, data compressor 11 converts the input analog signal into a digital signal and reduces the amount of data through a compression algorithm and stores data in a memory 13 according to the control of a system controller 14.

A system control 14 produces clock and control signals according to the output of a data selector 15, and provides a clock to the entire system, and also outputs data selected by a data selector 15 to a memory controller 12, interface unit 16, and a data compressor 11 and operates each according to their respective functions.

A memory control 12 produces memory control signals and addresses needed in a memory 13 according to the system control 14.

A memory 13 is a large-capacity memory device able to store a large amount of data, and which stores compressed data output from a data compressor 11 and outputs it to an interface unit 16, according to a memory control 12.

A data selector 15 selects mode, and data according to the instructions of a microcomputer 22, in that functions for compressing or providing data are selected according to the microcomputer 22, and outputs a data select signal to the system control 14 in order to select desired data.

An interface unit 16, which carries out input/output operations between the memory 13 and the separable storage unit 21 according to the instructions of the system control 14, performs interface functions by receiving data from the memory 13 and storing it in the separable storage unit 21 or by receiving data from the separable storage unit 21 and storing it in the memory 13.

A microcomputer 22 which encodes and decodes the input signal according to the output signal of the keyed input unit 27, has A/D and D/A conversion functions so that externally input analog or digital audio and video signals are encoded and decoded through a compression algorithm, and may be substituted by a encoding/decoding processor.

A filter unit 23 which filters audio signals output from the microcomputer 22, and which comprises an LPF (Low Pass Filter) 231 for filtering an L (Left) channel audio signal output from the microcomputer 22 and an LPF 232 for filtering an R (Right) channel audio signal output from the microcomputer 22, removes noise from the data output from the microcomputer 22 and passes only audible frequencies for an output audio signal.

A video signal D/A converter 24 converts the video data output from the microcomputer 22 from a digital to analog signal, and a display 25 displays the video signal output from video signal D/A converter 24.

A keyed input unit 27 generates signals for various functions from keyboard operations by a user and outputs control signals to the microcomputer 22 so that a suitable mode may be selected according to a desired function.

A data display 26 displays data searched according to the output of the microcomputer 22.

Also, a power source 20 is placed separately and provides power to the separable storage unit 21 so that stored data is not erased.

The operation of an audio and video recording and reproduction apparatus comprised as above is described below.

First, the detailed operation of a data reproduction unit 2 for reproducing data is as follows.

When keys for functions such as reproduction, search, repeat, and play are input at the keyed input unit 27, the microcomputer 22 receives these signals and outputs addresses and control signals to the separable storage unit 21. Compressed audio data is output from the separable storage unit 21 to the microcomputer 22 according to the addresses and control signals from the microcomputer 22. The compressed audio data output by the separable storage unit 21 is decoded and D/A converted at the microcomputer 22 and is output to a speaker through the LPF's 231, 232 of the filter unit 23. Also, when an external analog signal is input, the microcomputer 22 may carry out A/D conversion and reduce the amount of data by a compression algorithm and store the resulting data in the separable storage unit 21.

If the input to the keyed input unit 27 signals a record mode, the microcomputer 22 A/D converts the input analog signal to a digital signal and reduces the amount of data by encoding using a compression algorithm and stores the resulting data in the separable storage unit 21.

On the other hand, if the input to the keyed input unit 27 signals a reproduction mode, the microcomputer 22 generates control signals and addresses for memory access, reads data from the separable storage unit 21, and after decoding and D/A conversion, outputs it through the LPF's 231, 232 of the filter unit 23.

Alternatively, if the input to the keyed input unit 27 signals a search mode, the microcomputer 22 reads out a content table containing start/end and audio information of each data from a storage region of the separable storage unit 21 and outputs it through the data display 26.

Also, for video signals, a video signal received from the separable storage unit 21 may be decoded by the microcomputer 22 and D/A converted by the video signal D/A converter 24 to be output by the display 25.

Next, the operation of a data recording unit 1 for recording data is described in detail.

To output and/or input data from the memory 13 to the separable storage unit 21 or to store an analog signal through the data compressor 11 to the memory 13, information corresponding to each mode must be input from the data selector 15.

Accordingly, the input to the microcomputer 22 from the keyed input unit 27, that is, the information corresponding to each mode, is input to the data selector 15 from the microcomputer 22.

The information corresponding to each mode output from the microcomputer 22 allows the data selector 15 to choose compression or retrieval functions and outputs a data select signal to the system control 14 so that desired data may be selected.

If the data selector 15 is set to a record mode, so that the input analog signal is to be recorded, the system control 14 outputs a control signal, and the data compressor 11 compresses the input analog signal to reduce the amount of data, while the memory control 12 specifies a region in the memory 13 to store data, and the output of the data compressor 11 is stored in the region specified.

If the data selector 15 is set to a reproduction mode, data selected by the data selector 15 is to be obtained, and the system control 14 outputs a control signal to the memory control 12, which sends control signals and addresses to access the memory 13, the contents are down loaded through the interface unit 16 and stored in the separable storage unit 21.

Also, if the data selector 15 is in a record mode, where data from the separable storage unit 21 is stored in the memory 13, the system control 14 outputs a control signal, and the interface unit 16 reads out data from the separable storage unit 21 according to the control signals output from the system control 14, and data read from the separable storage unit 21 is written through the interface unit 16 in the storage region specified by the memory control 12 according to the control signal output from the system control 14.

In addition, if the data selector 15 is in a search mode, the system control 14 outputs control signals to the memory control 12 and the interface unit 16, a content table including start/end and audio information for each data of a storage region in the memory 13 is read out, and is output to the data display 26 through the interface unit 16, separable storage unit 21 and the microcomputer 22.

Figure 2:
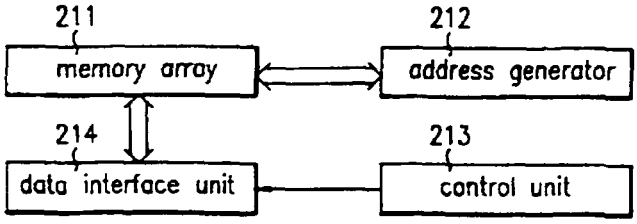
FIG. 2 is a detailed schematic diagram of a separable storage unit according to FIG. 1.

FIG. 2 is a detailed schematic diagram of a separable storage unit 21 as included in FIG. 1.

A separable storage unit 21 as shown in FIG. 2 comprises a memory array 211, address generator 212, control unit 213, and data interface unit 214.

A memory array 211 stores compressed data and is composed of memory cells, and an address generator 212 generates addresses that specify an area of the memory array 211.

A data interface unit 214 performs input/output operations on data stored in the memory array 211, and performs data transmission between an external device and the memory array 211 in parallel.

A control unit [214] *213* controls the address generator 212 and the data interface unit 214, and controls address generation and data input/output operations.

The detailed operation of a separable storage unit 21 as described above is as follows.

When the control unit 213 outputs a control signal for data input/output operations, a corresponding address is generated at the address generator 212 to specify a region in the memory array 211. Accordingly, data stored in a specified region in the memory array 211 is output through the data interface unit 214. Also, data input by an external device is input and stored in a specified region in the memory array 211 in the manner described above.

A memory recording and/or reproduction method according to the present invention is described in reference to FIG. 3-FIG. 7.

Figure 3:
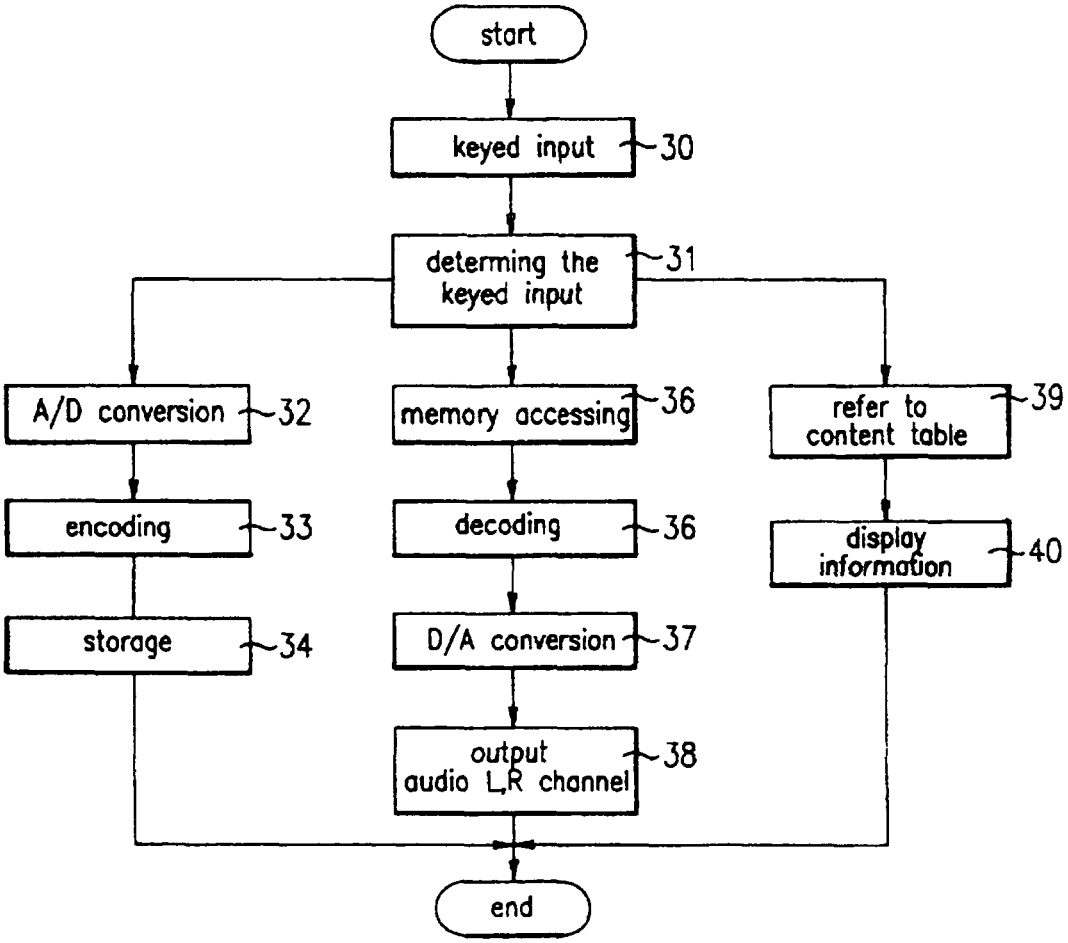
FIG. 3 is a flowchart of an audio and video signal recording and reproduction apparatus according to the present invention.

First, an overall description of a memory recording and/or reproduction method is given in reference to FIG. 3.

When an input is keyed in to the keyed input unit 27, keyed signal deciding steps 30 and 31 are performed.

If the keyed signal is determined to be a record signal, data recording steps 32, 33 and 34 for processing the input data and storing it in the separable storage unit are performed.

Here, the data recording steps include A/D conversion step 32 for A/D converting input data, encoding step 33 for encoding the A/D converted data, and storage step 34 for storing the encoded data in the separable storage unit.

The encoding step includes digital audio data encoding for encoding A/D converted digital audio data, and digital video data encoding for encoding A/D converted digital video data.

On the other hand, if the keyed signal is determined to be a reproduction signal, data reproducing steps 35, 36, 37 and 38 for reproducing and outputting data stored in the separable memory unit are performed.

Here, the data reproducing steps include memory accessing step 35 for accessing data stored in the separable storage unit, decoding step 36 for decoding accessed data that was stored in the separable storage unit, D/A conversion step 37 for D/A converting the decoded data, and output step 38 for outputting the D/A converted data.

The decoding step 36 above includes digital audio data decoding for decoding the accessed digital audio data stored in the separable storage unit, and digital video data decoding for decoding accessed digital video data stored in the separable storage unit.

In addition, if the keyed signal is determined to be a search signal, data searching steps 39 and 40 for reading out and displaying a content table of data stored in the separable storage unit are performed.

Figure 4:
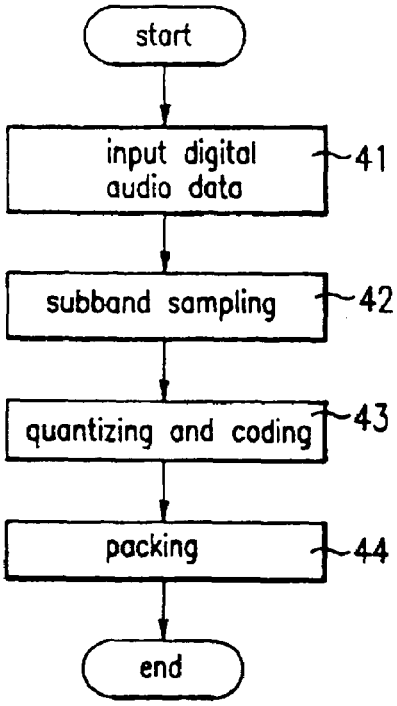
FIG. 4 is a detailed flowchart of the digital audio data encoding step included in FIG. 3.

As shown in FIG. 4, the digital audio data encoding step includes subband sampling steps 41 and 42 of D/A converted digital audio data, quantizing and coding step 43 of the subband sampled data, and packing step 44 of the coded data.

When digital audio data is input, subband sampling which divides the audio data into several frequency regions is carried out in steps 41 and 42, and after quantizing and coding based on human auditory characteristics, the data along with other necessary information is packed and the compressed audio data is output in steps 43 and 44.

Figure 5:
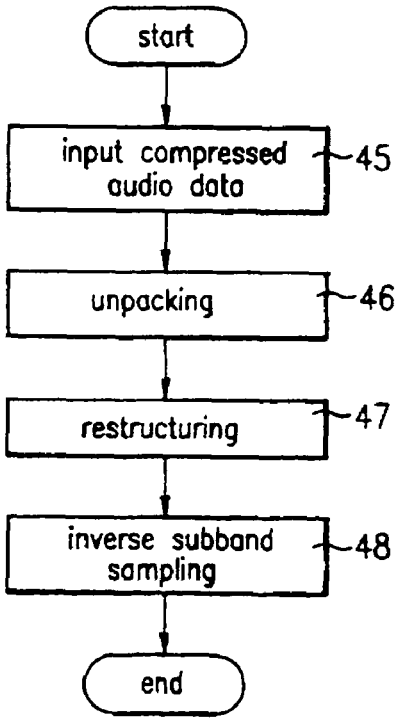
FIG. 5 is a detailed flowchart of the digital audio data decoding step included in FIG. 3.

Next, as shown in FIG. 5, the digital audio data decoding step includes unpacking steps 45 and 46 of the accessed compressed audio data stored in the separable storage unit restructuring step 47 of the unpacked data, and inverse subband sampling step 48 of the restructured data.

If compressed audio data is input in step 45, unpacking step 46, for retrieving information necessary for reproducing the various pieces of information, restructuring step 47, for restructuring the unpacked data, and inverse subband sampling step 48, for reproducing and outputting actual audio data from multi-frequency band data are carried out.

Figure 6:
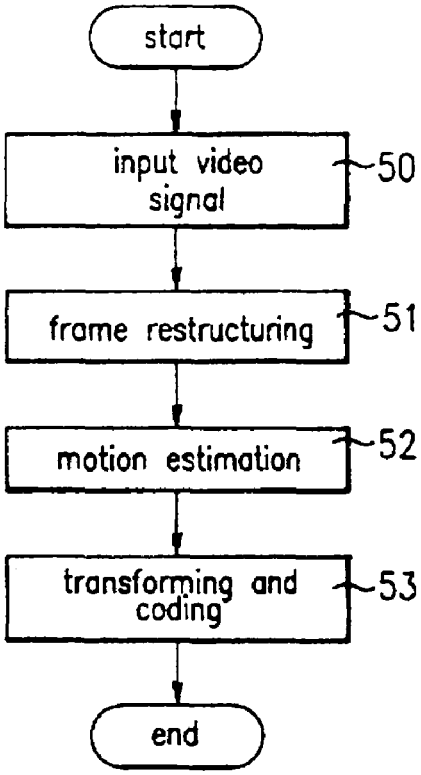
FIG. 6 is a detailed flowchart of the digital video data encoding step included in FIG. 3.

Also, as shown in FIG. 6, the digital video data encoding step includes frame restructuring steps 50 and 51 of D/A converted video data, motion estimation step 52 of detecting motion components from the restructured data, and transforming and coding step 53 of the motion estimated data into specified frequency region data.

If a digital video data is input, the data is divided into several screens, and the frame is restructured by specifying the output sequence in steps 50, 51, and motion estimation step 52 is performed by detecting motion components by comparing the present and preceding screens, time domain data is transformed into frequency domain data following the detected motion components and coding is carried out to reduce the amount of data in step 53, and the compressed video data is output.

Figure 7:
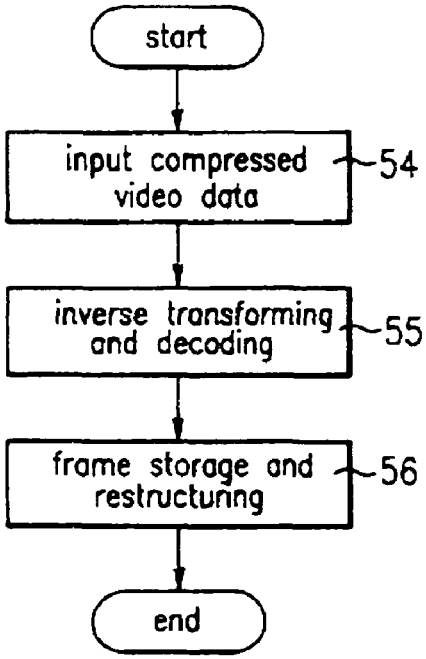
FIG. 7 is a detailed flowchart of the digital video data decoding step included in FIG. 3.

In addition, as shown in FIG. 7, the digital video data decoding step includes inverse transforming and decoding steps 54 and 55 of the accessed compressed video data stored in the separable storage unit into time domain data, and frame storage and restructuring step 56 of the decoded data.

When compressed video data is input in step 54, frequency domain data is inverse transformed and decoded into time domain data by reversing the coding process in step 55, and a frame is stored and restructured using detected motion components and reproduced video data is output in step 56.

Therefore, an embodiment of the present invention as described and operated in the manner above has the advantages that a separable memory makes a deck unnecessary and allows small, lightweight constructions, long playing time results from using a compression algorithm, read/write is not only possible, but is also robust to noise, data desired by the user is easily accessible, and adaptation as a substitute for magnetic or disk media is also possible.

In addition, while a preferred embodiment of this invention has been illustrated and described hereinabove, many possible modifications and variations thereof will become apparent to those persons skilled in the art without departure from the scope and spirit of this invention, as defined in the appended claims.

What is claimed is:

[1. An audio and video signal recording and reproduction apparatus comprising:

a data recording unit for recording audio and video signals;

a data reproduction unit for reproducing audio and video signals; and a separable storage unit for storing data by said data recording unit and outputting stored data through said data reproduction unit;

wherein said data reproduction unit comprises:

a keyed input unit for selecting a mode according to the function of a keyed input;

a microcomputer for encoding and decoding an input signal according to the output of said keyed input unit;

a filter unit for filtering audio signals output from said microcomputer; and a data display for displaying data searched according to the output of said microcomputer.]

[2. An audio and video signal recording and reproduction apparatus according to claim 1, wherein said data recording unit comprises:

a data selector for selecting a mode and data according to the control of said microcomputer;

a system control for generating clock and control signals according to output of said data selector;

a data compressor for converting an input analog signal to a digital signal and compressing the resulting digital signal according to the control of said system control;

a memory control for generating memory control signals and addresses according to the control of said system control;

a memory for storing compressed data output by said data compressor according to the control of said memory control; and an interface unit for performing data input/output operations between said memory and separable storage unit according to the control of said system control.]

[3. An audio and video signal recording and reproduction apparatus according to claim 1, wherein said data reproduction unit additionally comprises:

a video signal Digital/Analog converter for Digital/Analog converting video data output from said microcomputer; and a display for displaying video data output from said video signal Digital/Analog converter.]

[4. An audio and video signal recording and reproduction apparatus according to claim 1, wherein said filter unit comprises:

a first low pass filter for filtering an audio left channel signal output from said microcomputer; and a second low pass filter for filtering an audio right channel signal output from said microcomputer.]

[5. An audio and video signal recording and reproduction apparatus comprising:

a data recording unit for recording audio and video signals;

a data reproduction unit for reproducing audio and video signals; and a separable storage unit for storing data by said data recording unit and outputting stored data through said data reproduction unit;

wherein said separable storage unit comprises:

a memory array for storing data;

an address generator for generating addresses for specifying regions of said memory array;

a data interface unit for performing input/output operations on data stored in said memory array; and a control unit for controlling said address generator and data interface unit.]

[6. An audio and video signal recording and reproduction method comprising the steps of:

reading a keyed signal when the keyed signal is input;

processing data when the input key signal is a record signal and storing the result in a separable storage unit;

reproducing and outputting data stored in said separable storage unit if the keyed input is determined as a reproduction signal; and reading and displaying a content table of data stored in the separable storage unit if the keyed input is determined as a search signal;

wherein said processing step comprises the steps of:

Analog/Digital converting input data;

encoding said Analog/Digital converted data; and storing said encoded data in a separable storage unit.]

[7. An audio and video signal recording and reproduction method according to claim 6, wherein said encoding step comprises the steps of:

encoding any audio data; and encoding any video data.]

[8. An audio and video signal recording and reproduction method according to claim 7, wherein said step of encoding audio data comprises the steps of:

subband-sampling said audio data;

quantizing and coding said subband-sampled data; and packing said coded data.]

[9. An audio and video signal recording and reproduction method according to claim 7, wherein said step of encoding video data comprises the steps of:

restructuring the frame of said video data;

detecting motion components of said restructured data;

motion estimating the data to form motion estimated data; and transforming and coding said motion estimated data into data of specified frequencies.]

[10. An audio and video signal recording and reproduction method according to claim 6, wherein said data reproducing step comprises the steps of:

memory accessing said stored data in a separable storage unit;

decoding said accessed data stored in a separable storage unit;

Digital/Analog converting said decoded data; and outputting said Digital/Analog converted data.]

[11. An audio and video signal recording and reproduction method according to claim 10, wherein said decoding step comprises the steps of:

decoding any audio data stored in a separable storage unit; and decoding any video data stored in a separable storage unit.]

[12. An audio and video signal recording and reproduction method according to claim 11, wherein said step of decoding audio data comprises the steps of:

unpacking any accessed compressed audio data stored in a separable storage unit;

restructuring said unpacked data to form restructured data; and inverse-subband-sampling said restructured data.]

[13. An audio and video signal recording and reproduction method according to claim 11, wherein said step of decoding video data comprises the steps of:

inverse-transforming and decoding said accessed compressed video data stored in a separable storage unit into a time domain data; and storing and restructuring the frame of said decoded data.]

*14. An audio and video signal recording and reproduction apparatus, comprising:*

*a data recording unit configured to record at least one of audio and video data;*

*a data reproduction unit configured to reproduce at least one of audio and video data; and*

*a memory card configured to store data by said data recording unit and output stored data through said data reproduction unit,*

*wherein said data reproduction unit comprises:*

*a keyed input unit configured to select a mode according to the function of a keyed input;*

*a microcomputer configured to encode and decode an input signal according to the output of said keyed input unit;*

*a filter unit configured to filter audio signals output from said microcomputer; and*

*a data display configured to display data searched according to the output of said microcomputer,*

*wherein the data reproduction unit and the data recording unit are self-contained units that are separate from each other and in which the keyed input unit, the microcomputer, the filter unit and the data display in the data reproduction unit are not included within the data recording unit,*

*wherein the data recording unit is further configured to only record said at least one of the audio and video data and is not configured to reproduce said at least one of audio and video data,*

*wherein the memory card is disposed between the self-contained data recording unit and the self-contained data reproduction unit, and*

*wherein the self-contained data reproduction and recording units are directly connected via a bus connection.*

*15. The audio and video signal recording and reproduction apparatus according to claim 14, wherein said data recording unit comprises:*

*a data selector configured to select a mode and data according to the control of said microcomputer;*

*a system control configured to generate clock and control signals according to an output of said data selector;*

*a data compressor configured to convert an input analog signal to a digital signal and compress the resulting digital signal according to the control of said system control;*

*a memory control configured to generate memory control signals and addresses according to the control of said system control;*

*a memory configured to store compressed data output by said data compressor according to the control of said memory control; and*

*an interface unit configured to perform data input/output operations between said memory and memory card according to the control of said system control.*

*16. The audio and video signal recording and reproduction apparatus according to claim 15, wherein the memory card is disposed directly between the interface unit of the data recording unit and the microcomputer of the data reproduction unit.*

*17. The audio and video signal recording and reproduction apparatus according to claim 14, wherein said data reproduction unit further comprises:*

*a video signal Digital/Analog converter configured to Digital/Analog convert video data output from said microcomputer; and*

*a display configured to display video data output from said video signal Digital/Analog converter.*

*18. The audio and video signal recording and reproduction apparatus according to claim 14, wherein said filter unit comprises:*

*a first low pass filter configured to filter an audio left channel signal output from said microcomputer; and*

*a second low pass filter configured to filter an audio right channel signal output from said microcomputer.*

*19. The audio and video signal recording and reproduction apparatus according to claim 14, wherein the memory card is disposed directly between the data recording unit and the data reproduction unit.*

*20. The audio and video signal recording and reproduction apparatus according to claim 14, wherein the direct connection of the data recording unit and the data recording unit is a direct connection between the microcomputer of the data reproduction unit and a data selector of the data recording unit.*

*21. An audio and video signal recording and reproduction apparatus, comprising:*

*a data recording unit configured to record at least one of audio and video data;*

*a data reproduction unit configured to reproduce at least one of audio and video data; and*

*a memory card configured to store data by said data recording unit and output stored data through said data reproduction unit,*

*wherein said memory card comprises:*

*a memory array configured to store data;*

*an address generator configured to generate addresses for specifying regions of said memory array;*

*a data interface unit configured to perform input/output operations on data stored in said memory array; and*

*a control unit configured to control said address generator and data interface unit,*

*wherein the data reproduction unit and the data recording unit are self-contained units that are separate from each other and in which the keyed input unit, the microcomputer, the filter unit and the data display in the data reproduction unit are not included within the data recording unit,*

*wherein the data recording unit is further configured to only record said at least one of the audio and video data and is not configured to reproduce said at least one of audio and video data,*

*wherein the memory card is disposed between the self-contained data recording unit and the self-contained data reproduction unit, and*

*wherein the self-contained data reproduction and recording units are directly connected via a bus connection.*

*22. The audio and video signal recording and reproduction apparatus according to claim 21, wherein the memory card is disposed directly between the data recording unit and the data reproduction unit.*

*23. The audio and video signal recording and reproduction apparatus according to claim 21, wherein the memory card is disposed directly between an interface unit of the data recording unit and a microcomputer of the data reproduction unit.*

*24. The audio and video signal recording and reproduction apparatus according to claim 21, wherein the direct connection of the data recording unit and the data recording unit is a direct connection between a microcomputer of the data reproduction unit and a data selector of the data recording unit.*

* * * * *